May 6, 1952     A. W. SWANBECK     2,595,726
MINNOW PAIL
Filed Oct. 7, 1949
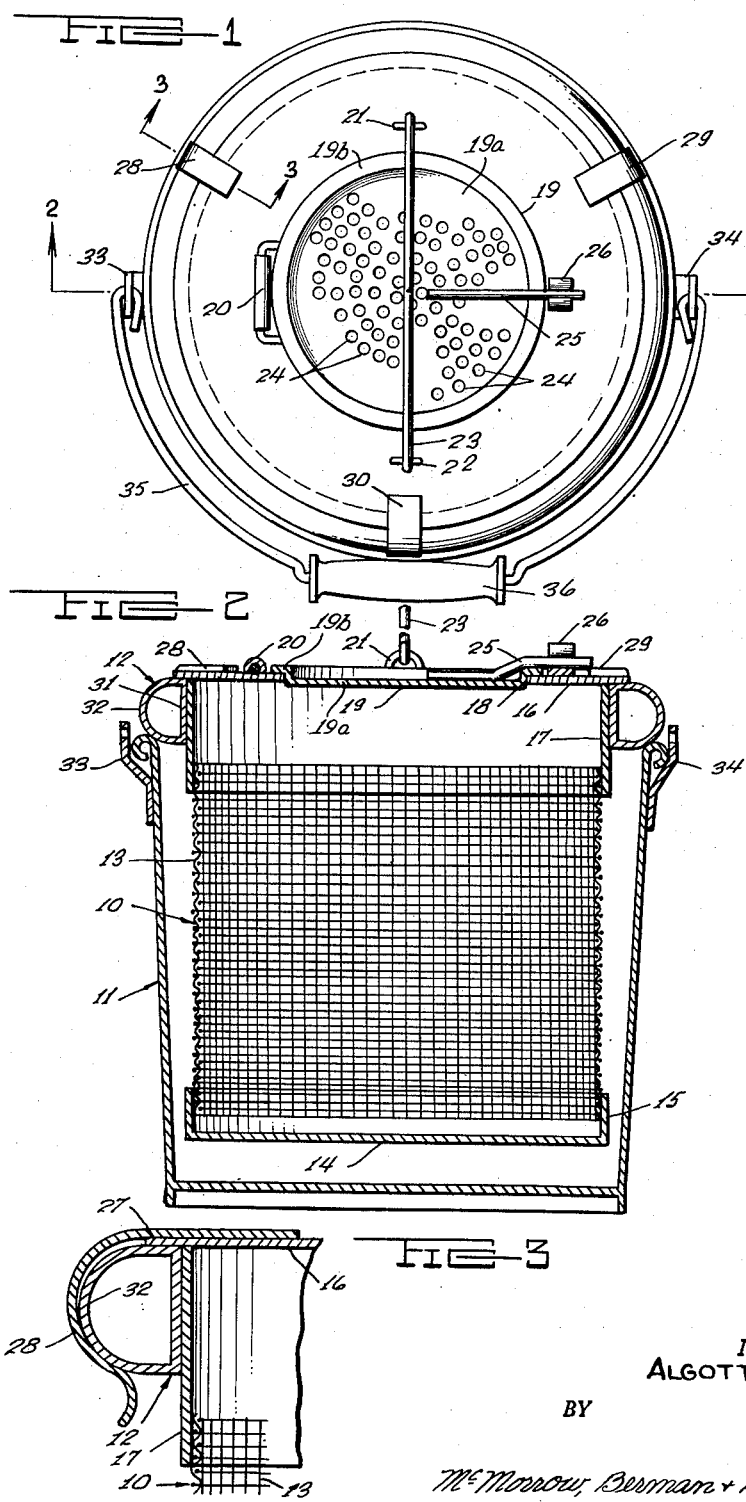
INVENTOR.
ALGOTT W. SWANBECK
BY
McMorrow, Berman & Davidson
ATTORNEYS Patented May 6, 1952

2,595,726

UNITED STATES PATENT OFFICE 2,595,726

MINNOW PAIL

Algott William Swanbeck, Tracy, Minn.

Application October 7, 1949, Serial No. 120,040

2 Claims. (Cl. 43—56)

This invention relates to minnow pails, and more particularly to a pail or container which can be placed in water to maintain live bait, such as minnows, alive for long periods of time.

It is among the objects of the invention to provide an improved minnow pail or live bait container which can be easily transported from place-to-place with live bait therein, can be floated on a body of water to maintain the bait alive and readily accessible while being used for fishing, and can be sunk in a body of water to maintain the bait alive over long periods of time while not being used, which is of simple, light weight construction, and provides for the free passage of water through the walls thereof, and which is durable in use, economical to manufacture, and neat and attractive in appearance.

Other objects and advantages will become apparent from a consideration of the following description and the appended claims in conjunction with the accompanying drawing, wherein:

Figure 1 is a top plan view of a minnow pail, illustrative of the invention;

Figure 2 is a longitudinal cross-section on the line 2—2 of Figure 1; and

Figure 3 is a cross-section on an enlarged scale of a fragmentary portion of the minnow pail taken substantially on the line 3—3 of Figure 1.

With continued reference to the drawing, the improved minnow pail comprises, in general, a container 10, an outer pail 11 for transporting the container while full of water, and a float 12 which may be operatively associated with the container 10 to float the latter in a body of water, or removed from the container, so that the container will sink in the water.

The container 10 comprises a hollow body which, as illustrated, is of substantially cylindrical shape, but may have various other shapes without, in any way, exceeding the scope of the invention. This body has a side wall 13 of foraminous material, such as a suitable wire mesh, a bottom wall 14 provided with an upstanding, marginal flange 15 which receives and is secured to the bottom end of the side wall 13, and a top wall 16 provided with a continuous depending flange 17 which receives and is secured to the upper end of the side wall 13.

The bottom wall 14 is preferably imperforate and formed of moderately heavy metal, so that it will have sufficient weight to assist in maintaining the body 10 upright when floated in the water.

The top wall 16 has an opening 18 therein, which opening is preferably circular, and disposed centrally of the top wall, and has an area of sufficient size so that the hand of a fisherman may be easily inserted through this opening to obtain live bait from the interior of the container. A door or closure 19 for the container is hinged to the top wall at one side of the opening 18 by a hinge 20, and is formed to provide a central portion 19a which is received in the opening 18, and a marginal portion 19b which rests upon the outer surface of the top wall surrounding the opening. Staples 21 and 22 are secured to the top wall at diametrically-opposite sides of the opening 18, and a bail 23 is secured at its opposite ends to these staples for lifting and carrying the container 10. This bail is arcuately curved on a radius sufficient to space the bail from the closure 19 when the bail is laid flat on the top wall of the container.

If desired, the door or closure 19 may be provided with perforations, as indicated at 24, and the door is provided with a latch tongue 25 which projects beyond the side of the door opposite the hinge 20 and is releasably engageable in a spring clip 26 carried by the top wall 16.

The top wall 16 extends marginally somewhat beyond the flange 17, as indicated at 27, in Figure 3, and angularly spaced-apart, resilient clips 28, 29 and 30 are secured to and project radially outwardly of the top wall 16, and are curved downwardly in spaced relationship to the outer side of the flange 17.

The float 12 is a hollow, frame-like member which, in the arrangement illustrated, is of circular, toroidal shape and has a substantially cylindrical inner wall 31 dimensioned to slidably receive the cylindrical flange 17 of the top wall of the container. The outer wall 32 of the float is substantially semi-circular in cross-sectional shape, and the float is of a size to buoyantly support the container 10 in a body of water. When the float is forced onto the flange 17 of the top wall, the spring or resilient clips 28, 29 and 30 overlie and press against the outer wall of the float, as particularly illustrated in Figure 3, to maintain the float in operative assembly with the container. When the float is so assembled with the container, the container-and-float assembly will float in a body of water with the top wall of the container just above the surface of the water and the remainder of the container, and particularly the perforate side wall 13, immersed in the water below the surface. As the water can pass freely through the foraminous material of the side wall of the container, any live bait in the container will have an adequate supply of fresh water for the bait to remain alive while being used for fishing. When the float is removed from the container, the container will submerge in a body of water. Under these conditions, a line is attached to the bail 23 and the container, with live bait therein, allowed to settle to the bottom of the body of water where the water is cooler and will maintain the bait alive for a longer period than will the water at the surface.

In order to transport the container 10 with water and live bait therein, the pail 11 is provided. This may be a conventional metal pail of a size to receive the container 10 and has, at its opposite sides, apertured ears 33 and 34. A bail 35 is attached at its opposite ends to the ears 33 and 34 and is preferably provided, near its midlength location, with a handle 36 to facilitate the carrying of the pail, container and float assembly, as illustrated in Figure 2. When the container 10 is placed in a body of water to preserve the live bait, it is, of course, removed from the pail 11.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is.

1. A live bait container comprising an upstanding hollow body open at the upper end thereof and having its side wall reticulated, a top wall provided with an opening, resting upon the open end of said body and secured to said body, said top wall having its bounding edge projecting beyond the side wall of said body, a float slidably receiving said hollow body and bearing against the projecting bounding edge of said top wall, and a plurality of spring clips positioned in spaced apart relation about the bounding edge of said top wall and each having one end secured to said top wall and having the other end depending below said top wall and embracingly holding said float against said projecting bounding edge.

2. A live bait container comprising an upstanding hollow body open at the upper end thereof and having its side wall reticulated, a top wall resting upon the open end of said body and secured to said body, a float slidably receiving said hollow body, and a plurality of spring clips positioned in spaced apart relation about the bounding edge of said top wall and each having one end secured to said top wall and having the other end depending below said top wall and embracingly holding said float.

ALGOTT WILLIAM SWANBECK.

REFERENCES CITED

The following references are of record in the file of this patent:

UNITED STATES PATENTS

| Number | Name | Date |
|---|---|---|
| 76,149 | Bellerjean | Mar. 31, 1868 |
| 307,375 | Busche | Oct. 28, 1884 |
| 521,244 | Muncaster | June 12, 1894 |
| 531,112 | Gilmore | Dec. 18, 1894 |
| 1,444,367 | Collamer et al. | Feb. 6, 1923 |
| 2,272,561 | Hubbell | Feb. 10, 1942 |
| 2,297,843 | Sharpnack | Oct. 6, 1942 |